United States Patent
Bauknecht et al.

(10) Patent No.: US 11,022,948 B2
(45) Date of Patent: Jun. 1, 2021

(54) SAFETY CONTROL DEVICE AND METHOD FOR CHANGING A RANGE OF FUNCTIONS OF A SAFETY CONTROL DEVICE

(71) Applicant: Pilz GmbH & Co. KG, Ostfildern (DE)

(72) Inventors: Jochen Bauknecht, Ostfildern (DE); Jörg Bruchertseifer, Ostfildern (DE); Károly Rick, Ostfildern (DE); Marcel Wöhner, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 440 days.

(21) Appl. No.: 15/986,407

(22) Filed: May 22, 2018

(65) Prior Publication Data

US 2018/0267497 A1 Sep. 20, 2018

Related U.S. Application Data

(63) Continuation of application No. PCT/EP2016/077456, filed on Nov. 11, 2016.

(30) Foreign Application Priority Data

Nov. 24, 2015 (DE) .......................... 102015120347.2

(51) Int. Cl.
*G05B 19/05* (2006.01)
*G06F 9/448* (2018.01)
(Continued)

(52) U.S. Cl.
CPC ........... *G05B 19/058* (2013.01); *G06F 9/445* (2013.01); *G06F 9/4484* (2018.02);
(Continued)

(58) Field of Classification Search
CPC ........ G05B 19/058; G06B 2219/24024; G06B 2219/24165; G06F 9/445; G06F 9/44505;
(Continued)

(56) References Cited

U.S. PATENT DOCUMENTS 7,286,885 B2 * 10/2007 Niwa .................. G05B 19/058 700/17
9,405,278 B2 * 8/2016 Stegmaier .......... G05B 19/0428
(Continued)

FOREIGN PATENT DOCUMENTS

DE       10240584 A1    3/2004
DE    102009022362 A1   11/2010
(Continued)

OTHER PUBLICATIONS

Office Action in corresponding Japanese Patent Application No. 2018-526917, dated Nov. 29, 2019, with English translation.
(Continued)

*Primary Examiner* — Linglan E Edwards
(74) *Attorney, Agent, or Firm* — Edell, Shapiro & Finnan, LLC

(57) ABSTRACT

A safety control device comprises: at least one input module having a number of input interfaces; at least one output module having a number of output interfaces; and a computing unit that includes: a programmable processor; a read-only memory to store an operating program for the processor with program code in machine-readable form for providing a function library with a number of functions of the safety control device; and a non-volatile, overwritable storage medium. A number of function activation codes are stored downloadably in the storage medium, and each of the function activation codes is capable of being assigned a function of the function library such that by logically linking the function activation codes to their associated functions of the function library only those functions of the function library can be activated whose function activation codes are stored in the storage medium.

9 Claims, 1 Drawing Sheet

(51) Int. Cl.
*G06F 9/445* (2018.01)
*G06F 21/57* (2013.01)
*G06F 21/62* (2013.01)
*G06F 21/76* (2013.01)
*G06F 21/78* (2013.01)

(52) U.S. Cl.
CPC .......... *G06F 9/44505* (2013.01); *G06F 21/57* (2013.01); *G06F 21/629* (2013.01); *G06F 21/76* (2013.01); *G06F 21/78* (2013.01); *G05B 2219/24024* (2013.01); *G05B 2219/24165* (2013.01)

(58) Field of Classification Search
CPC ........ G06F 21/57; G06F 21/629; G06F 21/76; G06F 21/78
See application file for complete search history.

(56) References Cited

U.S. PATENT DOCUMENTS

| | | | | |
|---|---|---|---|---|
| 9,880,547 | B2* | 1/2018 | Kohler | G05B 19/414 |
| 10,197,985 | B2* | 2/2019 | Papenbreer | G05B 19/048 |
| 2005/0055111 | A1* | 3/2005 | Law | G05B 19/045 |
| | | | | 700/83 |
| 2007/0016310 | A1* | 1/2007 | Niwa | G05B 19/058 |
| | | | | 700/18 |
| 2009/0313481 | A1* | 12/2009 | Kock | G06F 21/572 |
| | | | | 713/189 |
| 2014/0200687 | A1* | 7/2014 | Stegmaier | G05B 19/0428 |
| | | | | 700/79 |
| 2017/0123396 | A1* | 5/2017 | Papenbreer | G05B 19/048 |

FOREIGN PATENT DOCUMENTS

| | | |
|---|---|---|
| DE | 202014100518 U1 | 6/2015 |
| EP | 1686775 A | 8/2006 |
| EP | 1686775 A1 | 8/2006 |
| JP | 2001-525584 A | 12/2001 |
| JP | 2005-086253 A | 3/2005 |
| JP | 2006-048534 A | 2/2006 |
| JP | 2006-221229 A1 | 8/2006 |
| WO | 9844399 A2 | 10/1998 |
| WO | 9844399 A3 | 10/1998 |

OTHER PUBLICATIONS

Office Action in corresponding Japanese Patent Application No. 2018-526917, dated Jun. 9, 2020, with English translation.
International Search Report in corresponding PCT Application No. PCT/EP2016/077456, dated Feb. 17, 2017.
Office Action in corresponding Chinese Patent Application No. 201680068285.X, dated Nov. 17, 2020, with English translation.

* cited by examiner

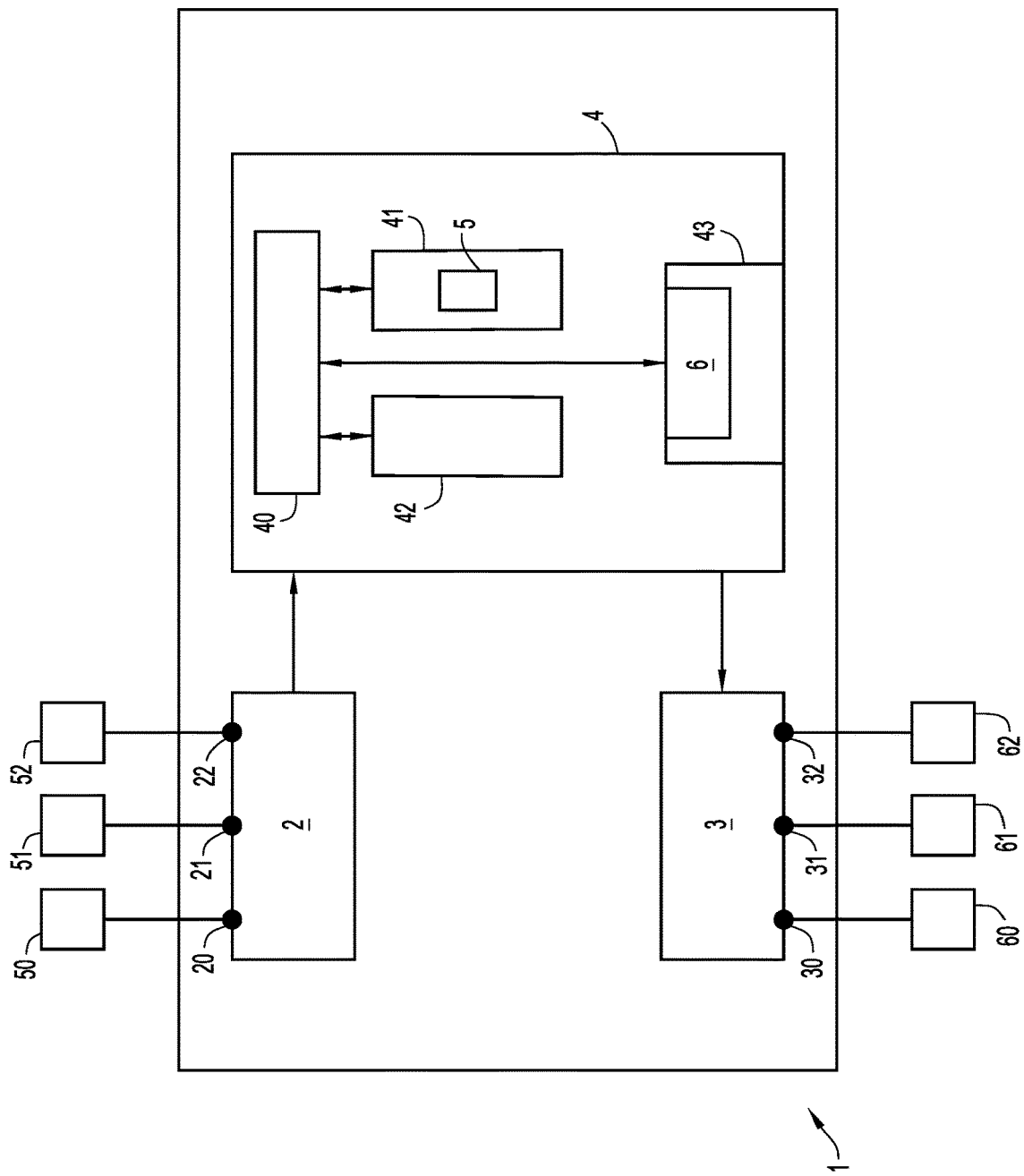

SAFETY CONTROL DEVICE AND METHOD FOR CHANGING A RANGE OF FUNCTIONS OF A SAFETY CONTROL DEVICE

CROSS REFERENCE TO RELATED APPLICATIONS

This application is a continuation of International Application No. PCT/EP/2016/077456, filed on Nov. 11, 2016, which claims priority under 35 U.S.C. § 119 to Application No. DE 102015120347.2 filed on Nov. 24, 2015, the entire contents of which are hereby incorporated by reference.

TECHNICAL FIELD

The present invention relates to a safety control device comprising at least one input module having a number of input interfaces; at least one output module having a number of output interfaces; and a computing unit, which is connected to the at least one input module and to the at least one output module and has a programmable processor and a read-only memory, wherein an operating program for the processor with program code in machine-readable form for providing a function library with a number n of functions of the safety control device is stored in a non-volatile form in the read-only memory. Moreover, the present invention relates to a method for changing a function range of a safety control device.

BACKGROUND

Control devices are known from the prior art in various embodiments. These control devices differ, in particular, from each other with respect to the function ranges implemented therein. In this case a distinction should be made, in particular, between programmable logic controllers, according to the European standard EN 61131, and safety control devices, according to the international standard IEC 61508, both of which can execute additional safety functions and, as a result, can also be used in safety-critical areas for controlling processes that are critical to safety.

A conventional programmable logic controller comprises an input module having a number of input interfaces, a computing unit, and an output module having a number of output interfaces. Sensors can be connected to the input interfaces in a manner known from the prior art. The sensors can provide, for example, information about an operating status of a machine or a machine plant and can make the information available as the input signals of the control device. These input signals are evaluated by the computing unit, with the result that output signals are generated by logic operations and optionally further signal and data processing steps; and the output signals are outputted over the output interfaces of the output module. Actuators are connected to the output interfaces of the output module; and the actuators can process the output signals and, on the basis thereof, execute certain actions.

A safety control device, which is known, for example, from the document WO 98/44399 A1 and which provides additional safety functions, is always able to ensure a safe state of the controlled process, such as, for example, of a machine or machine plant. In this context very high demands are placed on the intrinsic fail safety of the safety control device. Consequently, it is necessary that safety control devices be subjected to comprehensive and extensive testing in order to obtain the respective approval by the competent authorities prior to putting the safety control devices on the market.

Programmable logic controllers and safety control devices can be configured in the conventional manner with the aid of a user program and in this way can be adapted to the corresponding operating requirements of a user. Different functions (basic functions) of the control device or, more specifically, the safety control device are stored in an operating program that is separate from the user program. These functions define the basic range of functions of the programmable logic controllers or the safety control devices.

Since the functions, stored in the operating program, are often critical to safety, technical measures are usually taken that effectively prevent the user from modifying the operating program or replacing the operating program with another operating program. Consequently access to the operating program for the user is blocked by appropriate safety measures. This feature is very important, in particular, for safety control devices, since the certification by the competent authorities relates only to a combination consisting of the operating program with the associated hardware of the safety control device. If the user installs a new operating program, the fail safety of the safety control device can no longer be reliably ensured by the manufacturer.

If the range of available functions of a control device, in particular, a safety control device, is to be subsequently changed, the replacement of the operating program must generally be performed by the manufacturer of the control device or, more specifically, the safety control device. In this case the user has to shut down the control device or, more specifically, the safety control device as well as the machine or machine plant, connected to the controller, and has to send the control device or, more specifically, the safety control device to the manufacturer or has to have an authorized service technician replace the operating program. This procedure is often associated with prolonged down-times of the machine or machine plant that is connected to the control device or, more specifically, the safety control device, an aspect that has an adverse effect on the productivity and efficiency. In addition, it may turn out that the control device or, more specifically, the safety control device is not designed from the start for certain function ranges that are desired by the user, so that new hardware of the control device or, more specifically, the safety control device has to be procured, in order to use the modified operating program.

German patent application DE 102 40 584 A1, filed by the applicant, discloses a safety control device and a method for uploading a new operating program to such a safety control device. In this respect the method breaks with the past existing principle that the user himself may not install a new operating program in a safety control device. This method includes suitable measures, by which it can be ensured that the safety control device will continue to function in a fail-safe manner even after a new operating program has been installed. The replacement of an operating program with a new operating program can lead under some circumstances to problems, if, for example, during the update process, the power supply of the control device is interrupted unexpectedly, and the new operating program was not installed or not completely installed. In such a case, the control device is usually no longer readily functional, so that in this case the support of the manufacturer is often required to restore the reliability of the control device.

SUMMARY

Therefore, the object of the present invention is to provide a safety control device of the type, mentioned in the introduction, and a method for changing a function range of a safety control device, wherein a change in the range of available functions of the safety control device can be made easily and reliably in an alternative way.

A safety control device, according to the invention, is characterized in that the safety control device comprises a non-volatile, overwritable storage medium, which is integrated into the computing unit or is interchangeably accommodated in a storage medium interface of the computing unit, wherein a number of function activation codes are stored in the storage medium in a downloadable manner, and each of the function activation codes can be assigned a function of the function library such that by logically linking the function activation codes to their associated functions of the function library only those functions of the function library can be activated whose function activation codes are stored in the storage medium. The safety control device of the invention allows the user to make a simple (also subsequent) expansion of the functions or a modification of the functions in that by logically linking the function activation codes, stored in the non-volatile storage medium, to the functions of the function library of the operating program only those functions are activated and, as a result, unlocked that the user actually needs or for which the user has acquired the corresponding user rights from the manufacturer of the safety control device. As a result, the safety control device is scaleable and can be expanded in an easy and reliable way to include additional functions by overwriting the overwritable storage medium, which is integrated in the computing unit or is accommodated interchangeably in the storage medium interface and which may be preferably an SD card or a USB storage medium, with corresponding function activation codes, which are then logically linked to their associated functions of the function library, so that these functions are unlocked and activated. Protection against copying and manipulation can be obtained preferably by using storage mediums with cryptographic storage areas, in which the function activation codes are stored. In this way, the installation of a modified operating program, which is designed to modify the function range of the safety control device and which can lead to unexpected errors during the upgrade process, can be avoided in an advantageous manner. There are also advantages for the manufacturer of the safety control device. For example, it is not necessary to create different operating programs for different function ranges of the safety control device, to test them extensively and, if necessary, to have them certified together with the hardware. On the user side, individual ones of the activated and unlocked functions or also function groups having a plurality of functions can be selected selectively with a user program, parameterized and linked to each other in a suitable manner. For this purpose a programming interface or a programming device, which can be connected to the safety control device, can be provided.

In a preferred embodiment it may be provided that the function library comprises a first function group that, after activation by the associated function activation codes in a first basic configuration, makes available to the safety control device the function ranges for a signal processing-free signal input and signal output. This first basic configuration of the safety control device, which the user can acquire preconfigured from the manufacturer of the safety control device, forms the "simplest" embodiment of the control device, which allows only one signal input and one signal output.

In another preferred embodiment there is the possibility that the function library comprises a second function group which, after activation by the associated function activation codes in a second basic configuration, makes available to the safety control device the function ranges of a programmable logic controller. This second basic configuration may also be preconfigured by the manufacturer of the safety control device. Furthermore, by acquiring the rights to use the functions of the second function group and by linking the function activation codes to their associated functions of the function library in the manner described above, a user, who already possesses the safety control device with the first basic configuration, can convert his safety control device into a higher class of device that provides the function ranges of a programmable logic controller in accordance with the standard EN 61131. Therefore, neither a costly replacement of the hardware of the safety control device nor an installation of a completely new operating program is required.

In an additional advantageous embodiment it is proposed that the function library comprises a third function group that, after activation by the associated function activation codes in a third basic configuration, makes available to the safety control device the function ranges of a safety control device with safety-related control rules. Examples of unlockable safety functions are, inter alia, secure communication protocols and so-called "fail-safe" functions. This third basic configuration may also be preconfigured by the manufacturer of the safety control device. Furthermore, by acquiring the rights to use the functions of the third function group and by linking the activation codes to their associated functions of the function library in the manner described above, a user, who already owns the safety control device in the first or second basic configuration, can convert his safety control device to a higher class of device that provides the function ranges of a safety control device in accordance with the standard IEC 61508 with corresponding safety-related control rules. Therefore, neither a costly replacement of the hardware of the safety control device nor an installation of a completely new operating program is required. The safety control device, which is equipped with the additional safety functions, is configured to control in a fail-safe manner those processes that are critical to safety, such as, for example, a fail-safe shut-down of a machine or a machine plant. Furthermore, it is possible to unlock and activate those functions from the function library that help to increase the intrinsic safety of the safety control device.

In a particularly preferred embodiment it can be provided that the function ranges of the first and/or second and/or third basic configuration can be changed, in particular, expanded, by overwriting the storage medium and by storing function activation codes that are at least partially different from the basic configurations. Thus, the idea is not only to convert the safety control device into another device class by acquiring the rights to use a whole function group, but also to be able to make changes to the function ranges of the safety control device within the three different basic configurations. The unlocking takes place by linking the function activation codes to the functions of the function library in the manner described above.

In order to prevent, in particular, in the case of an interchangeable storage medium, unauthorized copying of the function activation codes or the use of the storage medium in a safety control device other than that, for which the user rights have been acquired, it may be provided in a preferred embodiment that at least one hardware identification data record is stored in the non-volatile, overwritable storage medium in a downloadable manner and that the hardware identification data record is configured to link unequivocally the storage medium and the functions, which are unlocked by the function activation codes, to the hardware of the safety control device.

The safety control device can only be used together with the authorized storage medium.

In an additional advantageous embodiment, there is the possibility that the function activation codes are stored in a cryptographically protected storage area of the storage medium. As a result, in the case of an interchangeable storage medium it is possible to prevent the function activation codes from being copied or manipulated without authorization. In the case of a storage medium that is permanently integrated in the computing unit, this measure can prevent the function activation codes from being manipulated.

Preferably the functions of the function library can be stored in a function table within the read-only memory. As a result, the linking of the function activation codes to the functions of the function library can be carried out in a particularly simple manner. Furthermore, it can be very easily recognized whether there may not be "matching" functions in the function library for one or more function activation codes.

In a particularly advantageous further development there is the possibility that the safety control device can be expanded to include one or more input modules and/or one or more output modules, where in this case additional functions of the input module(s) and/or of the output module(s) are included in the function library of the operating program. As a result, this aspect also makes possible a hardware scaling of the safety control device in an advantageous way. Since the functions of the additional input modules and/or output modules are already integrated into the function library of the operating program and can be activated and, in so doing, unlocked in the manner described herein, it is advantageously not necessary, when expanding the hardware, to install a completely new operating program in the safety control device.

An inventive method for changing a function range of a safety control device, in particular, a safety control device, comprises the steps of: providing the safety control device with an operating program, providing an overwritable, non-volatile storage medium, in which the function activation codes are stored in a downloadable manner, and linking the stored function activation codes to their associated functions of a function library of the operating program in the safety control device.

The method, according to the invention, makes it possible to adapt or expand the function range of an existing safety control device in a simple way without the operating program having to be replaced with a modified operating program. This feature has an advantageous effect on the process reliability in the course of adapting or expanding the function range of the safety control device.

In one advantageous embodiment it is proposed that after linking the stored function activation codes to the functions of the function library, at least one hardware identification data record is stored in the non-volatile storage medium in a downloadable manner. As a result, in particular, an unauthorized copying of the function activation codes or an unauthorized use of the unlocked function ranges in another safety control device can be prevented.

In a particularly advantageous embodiment there is the possibility that the function activation codes are stored in a cryptographically protected storage area of the storage medium. In this way the copying and manipulation of the function activation codes can be effectively prevented. In the case of an interchangeable storage medium, such as, for example, an SD card or a USB storage medium, there is, therefore, the possibility of using in an advantageous way the once acquired function activation codes at a later date with other safety control devices that are provided for this purpose. This aspect is advantageous, for example, in the event of a defect in the safety control device, since another functional safety control device can be made ready for operation in a very simple way by inserting the storage medium into a storage medium receptacle provided for this purpose.

BRIEF DESCRIPTION OF THE DRAWINGS

Other features and advantages of the present invention will become apparent from the following description of a preferred exemplary embodiment with reference to the accompanying FIG. 1, which shows in schematic form a highly simplified representation of a safety control device 1.

DETAILED DESCRIPTION

In this exemplary embodiment the safety control device 1 comprises at least one input module 2, at least one output module 3 and a computing unit 4, which is connected to the input module 2 and to the output module 3. The input module 2 comprises a number of input interfaces 20, 21, 22, which can be selectively activated or deactivated. As a result, individual or all input interfaces 20, 21, 22 can be activated in an application-specific manner, so that they can receive input signals. A sensor 50, 51, 52 can be connected to each of the input interfaces 20, 21, 22. Each of these sensors 50, 51, 52 may provide the input interfaces 20, 21, 22 with input signals, which may provide, for example, information about an operating status of a machine or machine plant. Examples of such sensors 50, 51, 52 include, inter alia, pushbuttons, switches, proximity sensors, temperature sensors, position sensors, speed sensors, pressure sensors and light barriers.

The safety control device 1 is designed, in principle, such that the input signals, received over the input interfaces 20, 21, 22, can be processed by the computing unit 4, the configuration and mode of operation of which will be described in more detail below. The output module 3 comprises a number of output interfaces 30, 31, 32, which can also be selectively activated or deactivated. As a result, individual or all output interfaces 30, 31, 32 can be activated in an application-specific manner, so that the output signals can be transmitted over the interfaces. An actuator 60, 61, 62 can be connected to each of the output interfaces 30, 31, 32. These actuators 60, 61, 62 may execute certain actions in response to the output signals that are provided over the output interfaces 30, 31, 32. Examples of such actuators 60, 61, 62 are, inter alia, contactors, relays, electronic switches as well as optical and/or acoustic signaling devices. The computing unit 4 lends itself to evaluating the input signals, received over the input interfaces 20, 21, 22, according to specific rules, in particular, by logic operations and optionally additional signal processing and/or data processing steps, and to providing the output interfaces 30, 31, 32 with corresponding output signals, which are forwarded to the actuators 60, 61, 62 in order to control them.

The computing unit 4 comprises a programmable processor 40, a read-only memory 41 and a main memory 42. An operating program 5 for operating the processor 40 is stored in the read-only memory 41 in a non-volatile form. This operating program 5, which is often referred to as firmware, has program code in machine-readable form and provides the safety control device 1 with a function library F having a number n of available functions $F_1$ to $F_n$. These functions $F_1$ to $F_n$ form the basic functions, for the execution of which the safety control device 1 is basically designed from a hardware and software perspective. For example, a user program as well as intermediate variables, which may be obtained, for example, in the course of processing the input signals, may be stored temporarily in the main memory 42.

The basic idea of the present invention is to provide now the safety control device 1 in an application-specific manner only with such functions $F_i$ from the function library F that the user of the safety control device 1 actually needs or for which he has acquired the corresponding user rights from the manufacturer of the safety control device 1, that allow the user to use these functions $F_i$. For example, in a first basic configuration, which may be preconfigured by the manufacturer, the safety control device 1 can have only the functions $F_i$ of an input and output device, where the functions are combined, in particular, to form a first function group FG1. In the input and output device the input signals are received over the input interfaces 20, 21, 22 of the input module 2, and these input signals—without signal processing by the computing unit 4—are outputted as output signals to the output interfaces 30, 31, 32 of the output module 3.

In a second basic configuration, which may also be preconfigured by the manufacturer of the safety control device 1, the safety control device 1 may have the typical functions $F_i$ of a programmable logic controller, where in this case the functions may be combined by the manufacturer, for example, to form a second function group FG2. After the corresponding function activation codes $FAC_i$ have been provided in a machine-readable form and have been logically linked to the functions $F_i$ for the purpose of activating these functions $F_i$, the safety control device 1 can acquire the input signals from the sensors 50, 51, 52 over the enabled input interfaces 20, 21, 22 of the input module 2. The computing unit 4 processes these input signals according to certain rules and generates the output signals that are outputted over the output interfaces 30, 31, 32 of the output module 3 and made available to the actuators 60, 61, 62, which can execute certain actions in response to the output signals.

In a third basic configuration, which may also be preconfigured by the manufacturer of the safety control device 1 and the functions $F_i$ thereof may be combined to form a third function group FG3, the safety control device 1 may have the typical functions for controlling in a fail-safe manner safety-critical processes, in particular, for shutting down a machine or a machine plant in a fail-safe manner. In this case certain functions are provided, for example, that have the effect that the process, controlled by the safety control device 1, can be converted into a safe state in the event of a fault.

The modification or expansion of the function range of the safety control device 1 is carried out in a different way than in the prior art, not by installing a new operating program 5, which is stored in the read-only memory 41 of the computing unit 4 in a downloadable manner. In the present case the function activation codes $FAC_i$ are provided in a machine-readable form; and the function activation codes can be logically linked to the individual functions $F_i$ of the function library F, in order to effect in this way the unlocking and activation of the functions. In this case a function $F_i$ of the function library F can be assigned a defined function activation code $FAC_i$. By logically linking the individual function activation codes $FAC_i$ to their associated functions $F_i$ of the function library F, it is possible to selectively unlock individual functions $F_i$ from the function library F of the operating program 5, in order to define in this way the function range of the safety control device 1.

In this exemplary embodiment the computing unit 4 comprises a storage medium interface 43, in which an overwritable, non-volatile storage medium 6 can be accommodated. This storage medium 6 may be preferably an SD card or a USB storage medium. In this context it is preferred that the function activation codes $FAC_i$ are stored in a cryptographically protected storage area of the storage medium 6. In this way, it is possible to prevent, in the case of an interchangeable storage medium 6, the function activation codes $FAC_i$ from being copied or manipulated without authorization. Furthermore, this feature also makes it possible in an advantageous way to use the once acquired function activation codes $FAC_i$ at a later date with other safety control devices 1 provided for this purpose.

In an alternative embodiment, there is also the possibility that the overwritable, non-volatile storage medium 6 is permanently integrated into the computing unit 4. This permanently integrated storage medium may also comprise a cryptographically protected storage area, in which the function activation codes $FAC_i$ are stored in a downloadable manner.

A number of function activation codes $FAC_i$ are stored in the storage medium 6 in a downloadable manner. In this case, each of the function activation codes $FAC_i$, which have been acquired by the user in a licensing process, is assigned one of the functions $F_i$ of the function library F such that by logically linking the function activation codes $FAC_i$ to the functions $F_i$ of the function library F only those functions $F_i$ can be activated whose function activation codes $FAC_i$ are stored in the storage medium 6. The aggregate of the functions $F_1$ to $F_n$ of the function library F, where for the execution thereof the safety control device 1 is basically configured from both a hardware and software perspective, can be stored in the read-only memory 5, for example in the form of a function table. When inserting the overwritable, non-volatile storage medium 6 into the storage medium interface 43 provided for this purpose, the function activation codes $FAC_i$, stored therein, can be read out by the processor 40. Furthermore, the associated functions $F_i$, which can be activated by the provided function activation codes $FAC_i$, can be read from the function table of the function library F. At the same time the function activation codes $FAC_i$ are logically linked to the associated functions $F_i$ and, as a result, are activated and unlocked for use. In the course of this authorization process it is possible to generate, for example, at least one hardware identification data record ID, which is then stored in the non-volatile, overwritable storage medium 6 in a downloadable manner. In this way the storage medium 6 and the functions $F_i$, which are unlocked by the function activation codes $FAC_i$, are linked unequivocally to the hardware of the safety control device 1. As a result, it is possible to prevent, for example, an unauthorized use of the function activation codes $FAC_i$ by linking the codes unequivocally to the hardware of the safety control device 1. The use of the safety control device 1 is only possible by the storage medium 6 that is authorized in this way. The unambiguous allocation of the hardware of the safety control device 1 to the storage medium 6 with the function activation codes $FAC_i$, stored therein, is not absolutely necessary. When the function activation codes $FAC_i$ are stored in a cryptographically protected storage area of the storage medium 6, the copying and/or manipulation of the function activation codes $FAC_i$ can be effectively prevented. Therefore, in the case of an interchangeable storage medium 6, such as, for example, an SD card or a USB storage medium, there is the possibility of using in an advantageous way the once acquired function activation codes $FAC_i$ at a later time with other safety control devices 1 that are provided for this purpose.

For example, it is possible to obtain a safety control device 1 in the second basic configuration from a safety control device 1 in the first basic configuration by unlocking the functions of the second function group FG2 without the hardware of the safety control device 1 having to be replaced and without a new operating program 5 having to be installed. Furthermore, it is possible to obtain a safety control device 1 in the third basic configuration from a safety control device 1 in the first or second basic configuration by unlocking the functions of the third function group FG3, without the hardware of the safety control device 1 also having to be replaced in this case and without a new operating program 5 having to be installed.

It goes without saying that by providing the function activation codes $FAC_i$ it is also possible to specifically unlock and activate within the three basic configurations of the safety control device 1 certain functions $F_i$ from the function library F, in order to adapt, in particular, to expand, the function range of the safety control device 1, without a new operating program 5 having to be installed for this purpose.

In addition, there is also the possibility that the safety control device 1 can be expanded to include one or more input modules 2 and/or one or more output modules 3, where in this case additional functions $F_i$ of the input module(s) and/or the output module(s) are already included in the function library F of the operating program 5. As a result, this aspect makes possible a hardware scaling of the safety control device 1 in an advantageous way. Since the functions of the additional input modules 2 and/or output modules 3 are already integrated into the function library F of the operating program 5 and can be activated and, as a result, unlocked in the manner described herein, it is advantageously not necessary, when the hardware is being expanded, to install a completely new operating program 5 in the safety control device 1, so that the additional functions can be used.

What is claimed is:

1. A safety control device, comprising:
    at least one input module having a number of input interfaces;
    at least one output module having a number of output interfaces; and
    a computing unit connected to the at least one input module and to the at least one output module, the computing unit including:
        a programmable processor;
        a read-only memory to non-volatilely store an operating program for the processor with program code in machine-readable form for providing a function library with a number n of functions ($F_1$-$F_n$) of the safety control device; and
        a non-volatile, overwritable storage medium that is integrated in the computing unit or is accommodated interchangeably in a storage medium interface of the computing unit, wherein: a number of function activation codes ($FAC_i$) are stored downloadably in the storage medium; and each of the function activation codes ($FAC_i$) is capable of being assigned a function ($F_i$) of the function library (F) such that by logically linking the function activation codes ($FAC_i$) to their associated functions ($F_i$) of the function library (F) only those functions ($F_i$) of the function library (F) can be activated whose function activation codes ($FAC_i$) are stored in the storage medium;
    wherein the function library (F) comprises a first function group (FG1), which, after activation by the associated function activation codes ($FAC_i$) in a first basic configuration, makes available to the safety control device function ranges for a signal processing-free signal input and signal output;
    wherein the function library (F) comprises a second function group (FG2), which, after activation by the associated function activation codes ($FAC_i$) in a second basic configuration, makes available to the safety control device function ranges of a programmable logic controller;
    wherein the function library (F) comprises a third function group (FG3), which, after activation by the associated function activation codes ($FAC_i$) in a third basic configuration, makes available to the safety control device function ranges of a safety control device with safety-related control rules.

2. The safety control device of claim 1, wherein the function ranges of the first, second, and/or third basic configuration is expandable by overwriting the storage medium and storing function activation codes ($FAC_i$) that are least partially different from the basic configurations.

3. The safety control device of claim 1, wherein, in the non-volatile, overwritable storage medium, at least one hardware identification data record (ID) is stored downloadably that is configured to link unequivocally the storage medium and the functions ($F_i$), unlocked by the function activation codes ($FAC_i$), to a hardware of the safety control device.

4. The safety control device of claim 1, wherein the function activation codes ($FAC_i$) are stored in a cryptographically protected storage area of the storage medium.

5. The safety control device of claim 1, wherein the functions ($F_1$-$F_n$) of the function library (F) are stored downloadably in a function table within the read-only memory.

6. The safety control device of claim 1, wherein the safety control device is expandable by one or more additional input modules and/or by one or more additional output modules, wherein functions associated with the one or more additional input modules and/or functions associated with the one or more additional output modules are included in the function library (F) of the operating program.

7. A method for changing a function range of a safety control device, the safety control device comprising:
    at least one input module having a number of input interfaces;
    at least one output module having a number of output interfaces; and
    a computing unit connected to the at least one input module and to the at least one output module, the computing unit including:
        a programmable processor;
        a read-only memory to non-volatilely store an operating program for the processor with program code in machine-readable form for providing a function library with a number n of functions ($F_1$-$F_n$) of the safety control device; and
        a non-volatile, overwritable storage medium that is integrated in the computing unit or is accommodated interchangeably in a storage medium interface of the computing unit, wherein: a number of function activation codes ($FAC_i$) are stored downloadably in the storage medium; and each of the function activation codes ($FAC_i$) is capable of being assigned a function ($F_i$) of the function library (F) such that by logically linking the function activation codes ($FAC_i$) to their associated functions ($F_i$) of the function library (F) only those functions ($F_i$) of the function library (F) can be activated whose function activation codes ($FAC_i$) are stored in the storage medium;

wherein the function library (F) comprises a first function group (FG1), which, after activation by the associated function activation codes ($FAC_i$) in a first basic configuration, makes available to the safety control device function ranges for a signal processing-free signal input and signal output;

wherein the function library (F) comprises a second function group (FG2), which, after activation by the associated function activation codes ($FAC_i$) in a second basic configuration, makes available to the safety control device function ranges of a programmable logic controller;

wherein the function library (F) comprises a third function group (FG3), which, after activation by the associated function activation codes ($FAC_i$) in a third basic configuration, makes available to the safety control device function ranges of a safety control device with safety-related control rules;

the method comprising:

non-volatilely storing the operating program for the processor in the read-only memory;

downloadably storing the function activation codes ($FAC_i$) in the overwritable, non-volatile storage medium; and linking the stored function activation codes ($FAC_i$) to their associated functions ($F_i$) of the function library (F) of the operating program in the safety control device.

8. The method of claim 7, wherein, after linking the stored function activation codes ($FAC_i$) to the functions ($F_i$) of the function library (F), at least one hardware identification data record (ID) is stored downloadably in the overwritable, non-volatile storage medium.

9. The method of claim 7, wherein the function activation codes ($FAC_i$) are stored in a cryptographically protected storage area of the overwritable, non-volatile storage medium.

* * * * *